UNITED STATES PATENT OFFICE.

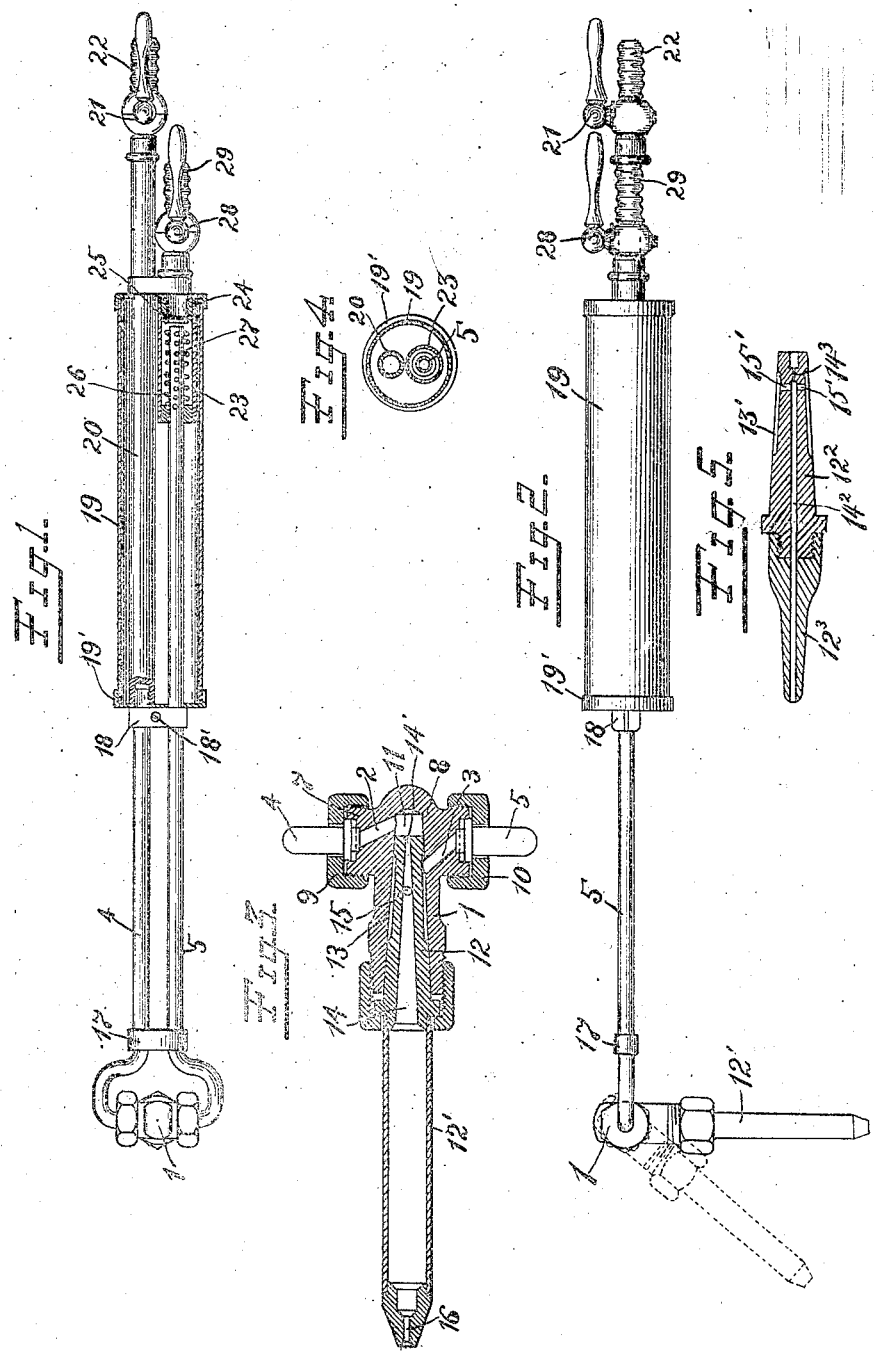

RUDOLPH E. BRUCKNER, OF MOUNT VERNON, NEW YORK, ASSIGNOR TO COMMERCIAL ACETYLENE COMPANY, OF NEW YORK, N. Y., A CORPORATION OF NEW JERSEY.

WELDING AND BRAZING TOOL.

935,458.   Specification of Letters Patent.   Patented Sept. 28, 1909.

Application filed January 22, 1909. Serial No. 473,703.

*To all whom it may concern:*

Be it known that I, RUDOLPH E. BRUCKNER, a citizen of the United States, residing at Mount Vernon, county of Westchester, State of New York, have invented certain new and useful Improvements in Welding and Brazing Tools, of which the following is a full, clear, and exact description.

My invention relates to improvements in welding or brazing tools of the type in which the heating effect is produced by a combined oxygen and acetylene flame.

The object of the invention is to provide for adjustment between the head and the body or handle of the tool whereby the burner tip may be more conveniently positioned for operation upon different classes of work.

A further object of the invention is to provide a safety check against flash-back in the acetylene tube.

A further object is to improve the construction and arrangement of parts of the head and tip whereby the greatest heating effects may be secured with the minimum consumption of gas.

With these and other objects in view, the invention consists in the construction and arrangement of parts, a preferred embodiment of which is illustrated in the accompanying drawings, in which, Figure 1 is a plan view partly in section of a device embodying my invention. Fig. 2 is a side elevation of the device. Fig. 3 is a detail sectional view of the head and tip. Fig. 4 is a cross sectional view through the rear end of the tool. Fig. 5 shows a modified form of the head and tip.

Referring to Figs. 1 to 4 inclusive, the embodiment of my invention selected for illustration comprises a head 1 having lateral inlets 2 and 3 which communicate respectively with the oxygen supply tube 4 and the acetylene supply tube 5.

In ordinary cases or where work is being performed upon more or less heavy masses of metal, the head and tip of the tool may be positioned at a right angle to the tool body, as usual, whereby the jet is directed at a right angle to the surface of the work while the body of the tool is held substantially parallel to the work. Where, however, work is being performed upon thin sheet metal, such direct action of the jet would tend to burn a hole in the thin sheet rather than heat it to the proper temperature for welding or brazing. It is essential therefore in such cases to temper more or less the heating effect of the jet which may be done by directing it at an angle to the surface to be heated. In the case of large flat surfaces, such as presented by large sheets of sheet metal, this is practically impossible when the jet or head is fixed at a right angle to the body of the tool, as illustrated in Fig. 2, for, owing to the length of the tool body, it is impossible to tilt the same sufficiently over the work to direct the flame at the necessary angle to the surface without moving the tip so far away from the surface as to render the heating effect inadequate. To remedy this defect the connection between the head and tool body in my improved device is so arranged, that the head may be rotated or adjusted to any desired angle to the tool body whereby the head and tip may be conveniently positioned either at a right angle to the tool body, as illustrated in Fig. 2, or may be turned to direct the jet at any desired angle to the work surface. For this purpose the head 1 is provided with threaded bosses 7 and 8, to which the tubes 4 and 5 respectively are secured by means of the screw caps 9 and 10 respectively. The screw caps may be tightened sufficiently to afford firm frictional hold for the head in any of its adjusted positions.

Within the head 1 is a central chamber or passage 11. This chamber, as shown in Fig. 3, is tapered to receive a correspondingly tapered tip 12, which tip is provided with an annular groove or cut-away portion forming an annular chamber 13, with which the inlet 3 from the acetylene tube 5 communicates when the tip 12 is in position. The tip is so proportioned as not to reach entirely to the bottom of the chamber 11, whereby space is left at the inner end of said chamber, with which the inlet 2 from the oxygen tube communicates. The tip 12, furthermore, is provided with a tapered passage 14 opening into the chamber 11 at 14', whereby it communicates with the oxygen inlet 2, and said plug also has lateral passages 15 communicating with the annular chamber 13, which in turn is in communication with the acetylene inlet 3. The opening 14' at the inner end of the passage 14 and the openings 15 are so relatively proportioned as to admit the oxygen and acetylene gases in the proper proportions at their respective pressures to the passage 14 to produce the desired mixture. Upon the outer end of the tip 12 is mounted an extension such as 12', Fig. 3, which for different sizes of tips may be of substantially the same diameter but vary in length and in the diameters of their exits 16 to accord with the character of work to be performed. For the finer or lighter work, shorter extensions having finer openings or exits are employed. The passage 14 in the tip 12 is so designed in diameter and length as to form with the particular extension attached thereto a mixing chamber properly proportioned with respect to the orifice 16 of the extension to produce a mixture of gas which will afford the most efficient flame for the particular work operated upon.

In the modified form of tip shown in Fig. 5, the same comprises a tapered portion $12^2$ having the annular groove 13' to form the annular acetylene chamber. The passage $14^2$ in this tip, however, is of uniform diameter throughout both the body portion $12^2$ and the extension $12^3$ and communicates with the chamber 11 and thence with the oxygen inlet 3 by a small orifice $14^3$. The acetylene inlets 15' in this form of tip are as shown located closely adjacent the orifice $14^3$ whereby the oxygen jet entering therethrough into the passage $14^2$ will draw the acetylene gas into said chamber.

The oxygen and acetylene tubes are held rigidly together by brackets 17 and 18, and their rear ends extend removably into a cylindrical shell 19 forming a handle for the tool. The rear end of the oxygen tube is detachably seated in the forward end of a tube 20, mounted in said shell, and which extends through the rear thereof and is provided with a stop cock 21 and a flexible gas tube connection 22. The rear end of the acetylene tube, which extends well into the shell, has mounted thereon a valve chamber 23 provided with a valve seat 24 upon which is seated a small disk-like valve 25. The valve 25 is held against the valve seat by a spiral spring 26 surrounding the rear end of the acetylene tube and extending between said valve and the forward end of the valve chamber. The rear end of the acetylene tube is closely adjacent to the valve 25 and serves as a stop therefor when the valve opens under pressure of the acetylene gas and against pressure of the spring 26, and that portion of the acetylene tube within the valve chamber is provided with lateral perforations 27 to admit the gas from the supply cock 28, which latter is provided with suitable connection 29 for a flexible tube communicating with the acetylene supply. By means of this valve construction at the rear end of the acetylene tube, all danger of a flash-back in the tool caused, for example, by obstruction of the tip orifice or otherwise, when the tool is in operation, is prevented from reaching the acetylene supply tank; for, as is well known, the compression caused by such flash always precedes the flame of the flash, hence should such flash-back take place, such compression of the gas within the acetylene tube would reach the valve 25 in advance of the flame and close said valve before said flame could pass beyond it. This valve, therefore, acts as an effective check to prevent all danger of explosion of the acetylene supply from the flash. It is to be noted that the bracket 18 is formed in two parts which are clamped together by a suitable screw 18', upon loosening of which the bracket may be slid along the tubes and permit the opening of the cap 19' of the cylinder 19, to afford access to the interior thereof and to facilitate the assembling of the apparatus.

While I have herein disclosed a particular embodiment of my invention, it is understood the same may be varied in details and relative arrangement of parts without departing from the spirit or scope thereof.

What I claim is:

1. In a hand welding and brazing tool, a body portion comprising a plurality of rigid gas conducting tubes forming an elongated handle for said tool, means at the rear end of said handle for connecting flexible tubes to said rigid tubes, and a head adjustably mounted upon the opposite end of said handle and arranged to be adjusted at different angles thereto.

2. A welding and brazing tool comprising a head, a gas supply tube communicating therewith, a valve chamber located at the inner end of said tube, a check valve seated in said chamber and interposed between the valve seat and the end of said tube.

3. In a welding and brazing tool, a gas supply tube, a valve chamber mounted upon the rear end thereof, a valve seat in said chamber located opposite the end of said tube, a valve interposed between the end of the tube and said valve seat, and a spring surrounding said tube and arranged to hold said valve upon its seat.

4. In a welding and brazing tool, a head, a gas supply tube communicating therewith, a valve chamber mounted upon the rear end of said tube, a valve located in said chamber and closely adjacent to the end of said tube, means for holding said valve yieldingly against its seat, said tube arranged to act as a stop for said valve when opened by pressure of the gas supply.

5. In a welding and brazing tool, a head, a gas supply tube communicating therewith, a valve chamber inclosing the rear end of said tube, a valve seat in said chamber, a valve interposed between the end of said tube and said valve seat, means to hold said valve yieldingly upon its seat, the end of said tube being arranged to act as a stop for said valve when opened by pressure of the gas supply, that portion of the tube within the valve chamber being provided with perforations for the admission of the gas to said tube.

6. In a welding and brazing tool, a head having a tapered passage therein, a gas inlet communicating with the rear end of said passage, a tip comprising a tapered portion fitting within said passage and having a mixing chamber therein communicating with said passage, an annular passage surrounding said tapered portion, a second gas inlet in said head communicating with said annular passage, and passages in said tip between said annular passage and said mixing chamber.

7. In a welding and brazing tool, a head having a tapered passage therein for the reception of a tip and a tip having a tapered portion fitting within said passage and forming gas-tight joints therewith, and a mixing chamber within said tip, said tip having gas inlets and an outlet orifice.

8. In a welding and brazing tool, a head having a tapered passage therein, a tip having a tapered portion fitting within said passage, an annular passage intermediate of the ends of said tapered portion, those portions of said tip on either side of said annular passage forming gas-tight joints with the walls of said tapered passage, said tip having gas inlets communicating with said tapered passage and said annular passage and having a gas orifice.

RUDOLPH E. BRUCKNER.

Witnesses:
M. E. GARRETT,
R. W. POWELL.